May 4, 1926.
G. A. MITCHELL
PRINTER
Filed July 23, 1923
1,583,482
2 Sheets-Sheet 1
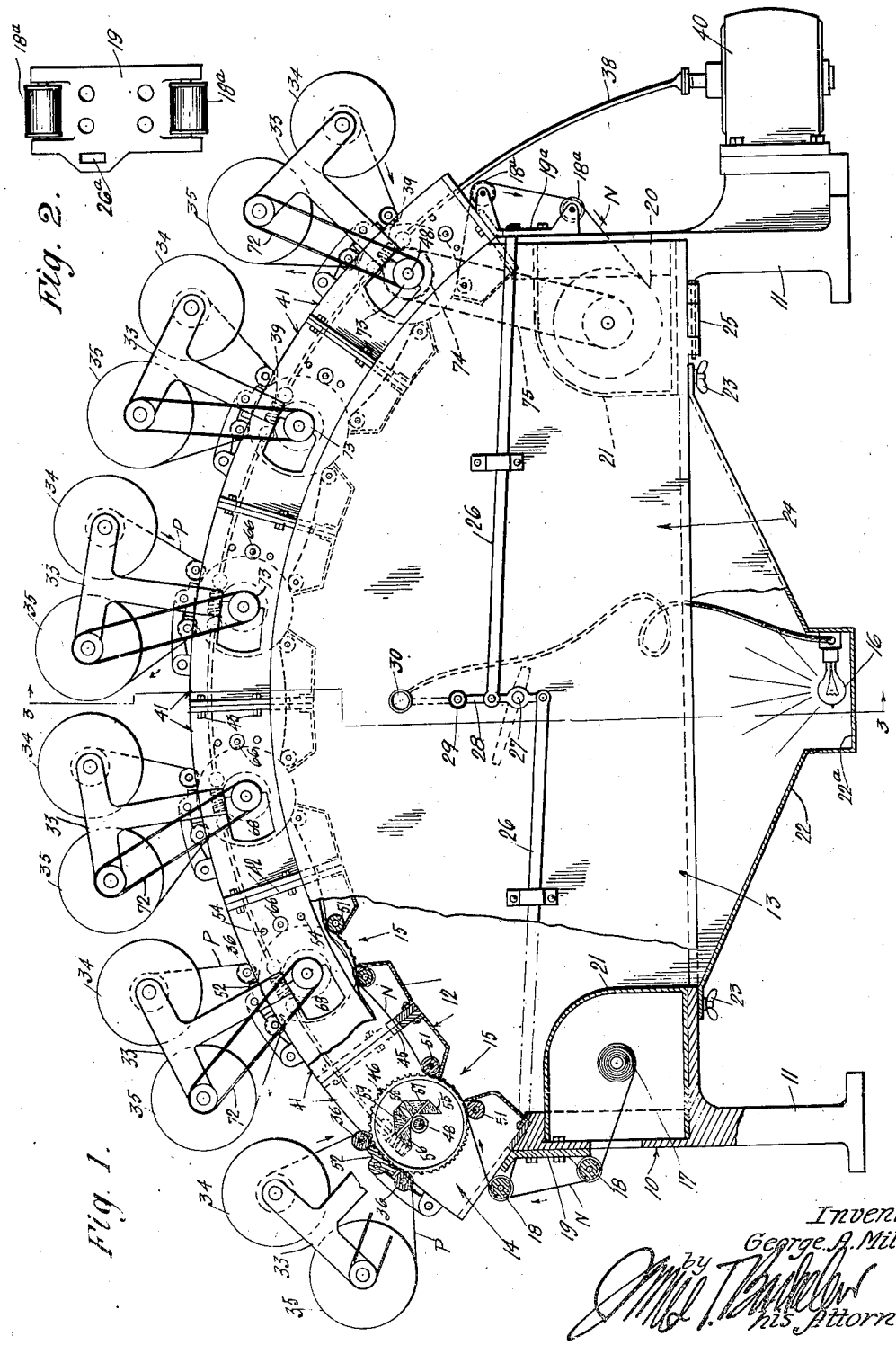
Inventor.
George A. Mitchell
his Attorney.

May 4, 1926. 1,583,482
G. A. MITCHELL
PRINTER
Filed July 23, 1923 2 Sheets-Sheet 2
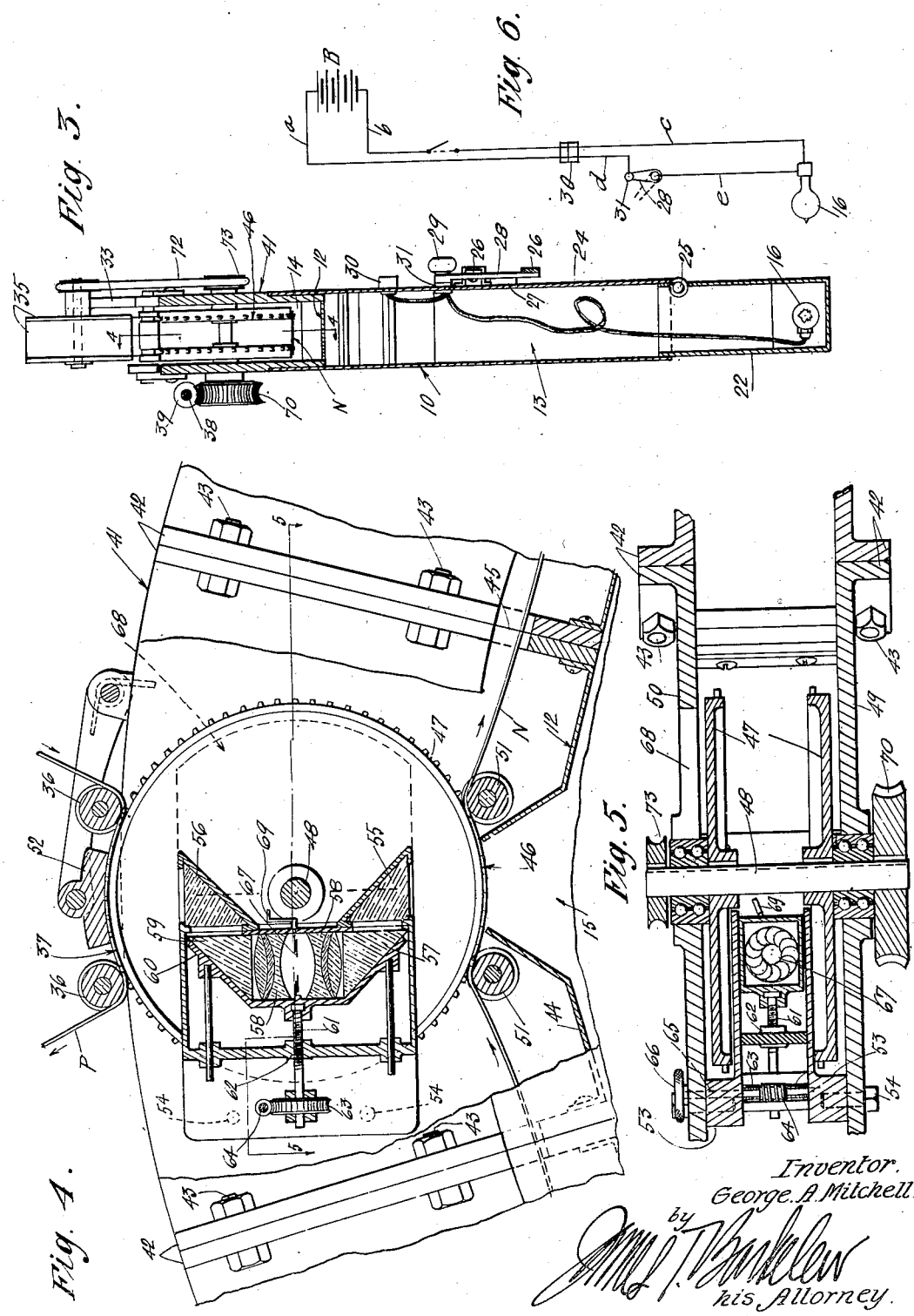
Inventor.
George A. Mitchell.
his Attorney.

Patented May 4, 1926.

1,583,482

UNITED STATES PATENT OFFICE.

GEORGE A. MITCHELL, OF LOS ANGELES, CALIFORNIA, ASSIGNOR TO MITCHELL CAMERA CORPORATION, A CORPORATION OF CALIFORNIA.

PRINTER.

Application filed July 23, 1923. Serial No. 653,134.

*To all whom it may concern:*

Be it known that I, GEORGE A. MITCHELL, a citizen of the United States, residing in Los Angeles, county of Los Angeles, State of California, have invented new and useful Improvements in Printers, of which the following is a specification.

This invention relates to devices for printing positive films from negative films and has for its principal object the provision of means for simultaneously printing a plurality of positive films from a single negative film.

I have provided novel means whereby the negative film and the several positive films move synchronously and at a constant advancing speed, and the arrangement of the various parts making up the preferred embodiment is such that I need employ but a single light source for illuminating the negative film, irrespective of the number of positive films exposed. In general, I accomplish this by passing the negative film through an arcuate course about the light source as a center and by arcuately grouping the positive film carrying and advancing units about and beyond the arcuate course of the negative film so that the exposed portions of the films are equi-distant from the light source. Also I make the structure such that its identical units may be built up into machines of different capacities.

The advantages of increased output and decreased production cost made possible by a device having the above described characteristics are self-evident and obvious and need not be discussed at length. However, further objects, advantages, and features of novelty of a particular embodiment of my invention will be discussed in the following description, reference being had to the accompanying drawings in which—

Fig. 1 is an elevation of a printer embodying the invention, certain parts being shown in section and other parts being broken away to more clearly illustrate the structural features;

Fig. 2 is an enlarged end elevation of an idler assembly used in connection with the guiding of the negative film through the apparatus;

Fig. 3 is a vertical section on line 3—3 of Fig. 1;

Fig. 4 is an enlarged, fragmentary, vertical section on line 4—4 of Fig. 3;

Fig. 5 is a horizontal section on line 5—5 of Fig. 4; and

Fig. 6 is a wiring diagram illustrating one manner in which the illuminating circuit may be controlled.

In general, my invention consists of means for advancing a single negative film, synchronously advancing a plurality of positive films and simultaneously printing the several positives from the single negative. The adaptation of the operative principles of my invention to printers of various types, such as contact and projection and to printers wherein the films are either intermittently or continuously advanced, lies within the broad scope of my invention, and therefore the following description of a particular embodiment is not to be considered as a limitation of the invention but merely as an explanation of a preferred embodiment.

I also wish to state at the outset, that although I do and prefer to group the several positive film units arcuately about a single illuminant, I may arrange them otherwise and provide seperate illuminants for each unit without departing from certain features of my invention,—notably its "unit" structure feature.

For purposes of illustration, I have chosen to show and describe my invention as embodied in a "projection" printer, in contradistinction to "contact" printers, and the lens system and method of supporting and advancing the positive and negative film is shown to be similar to that disclosed in my co-pending application for patent on printers, filed Sept. 5, 1922, Ser. No. 586,329. This particular arrangement is especially advantageous in that it insures proper registration of positive and negative film, and eliminates shutters and intermittent moving mechanism, etc., as has been pointed out in detail in said copending application.

Throughout the specification, I refer to the negative film as being the one printed from and the positive film as the one being printed, but it will be understood that this specific reference is made merely for convenience of description and is not to be construed as a limitation.

Referring first to Figs. 1 and 3, I have shown the casing or housing 10, supported by standards 11, and generally divided by partition 12 to form illuminating compartment 13 and film compartment 14. Partition 12 is provided with apertures 15 whereby light from source 16 is admitted to compartment 14 to illuminate limited portions of negative film N, which is carried from supply reel 17 over the rollers 18 on plate 19, through compartment 14, and over rollers 18ª on plate 19ª to the take-up reel 20. Reels 17 and 20 are protected against the light from illuminant 16 by partitions 21.

Illuminant 16 is positioned within the base 22 of casing 10, which base may be removably secured to the casing proper by wing nuts 23, and the lower walls of the base may diverge from the light source as shown, while the surfaces 22ª may be suitably plated and polished or otherwise prepared to serve as reflecting surfaces for light emanating from illuminant 16.

A side door 24 hinged to casing 10 at 25 provides means whereby access may be gained to the interior of casing 10 for the purpose of inspection or for threading the film through compartment 14. However, in order that such portions of positive film P as lie outside casing 10, may not be exposed to light from illuminant 16 when door 24 is open, means are provided for automatically extinguishing said light just prior to the opening of said door and thus prevent undesirable illumination during such periods as the door is left open. This may be accomplished in many ways, the method shown comprising the passing of the illuminating circuit through the door locking mechanism, whereby when the door is unlocked, the circuit to the illuminant is broken. Bolts 26 are pivotally connected on opposite sides of the pivotal mounting 27 of lever 28, which lever terminates in the handle 29. When lever 28 is in the full line position of Fig. 1, the ends of bolts 26 extend through keepers or sockets 26ª (Fig. 2) in plates 19 and serve to hold door 24 closed so compartments 13 and 14 are light tight. Fig. 6 shows one method of circuiting, wherein wires a and b lead from opposite poles of battery B to plug 30 in door 24. Wire c from socket 30 leads directly to lamp 16, while wire d leads to contacts 31 projecting to the exterior of the casing. Wire e extends from lever 28 to light 16, and this lever being of metal and adapted to contact with 31 when the door is fully locked, serves as a switch for opening and closing the illuminating circuit. Thus, before door 24 can be opened, lever 28 must be swung to the dotted line position in Fig. 1 to release bars 26 from sockets 26ª, such movement of the lever serving to open the circuit and extinguish the light. It will be understood, I may substitute other methods for controlling the illuminant or light from the illuminant without departing from the spirit of my invention. For instance, light 16 may be allowed to burn continuously and I may interpose a shutter between the illuminant and the door, the shutter being arranged to close over the illuminant just prior to the opening of the door to confine the light entirely within the base of the casing and thus preventing it from striking the exposed portions of film P when the door is open.

Supported by T-brackets 33 from the top of the respective units (to be described) are reels for carrying the positive film, these reels being arranged in pairs, each pair comprising a supply reel 34 and a take-up reel 35, a positive film being led from one to the other and beneath rollers 36 to bring a portion 37 of the film in registry with one of the apertures 15 and such of the negative film N as extends across that particular aperture.

Since, in the illustrated embodiment, but one source of light is used, it is desirable that the several apertures 15 and film portions 37 be equi-distant from the source of light. Hence, I have shown the partition 12 as being in the form of an arc of a circle struck about light 16 as a centre, and the several film advancing units are similarly arranged so that each aperture 15 and such portions of the positive and negative films as are exposed to light from illuminant 16 are arranged in radial alignment from illuminant 16.

The power shaft 38 from which the film advancing mechanism is driven, may be of flexible type, or may be made up of sections of straight shafting suitably journalled to casing 10 and provided with universal joint connections between the several sections to adapt the shaft to the arcuate arrangement of the film advancing units. The shaft 38 carries worms 39 which, in turn, drive the film advancing mechanisms, motor 40 serving to furnish the power to the shaft.

I have illustrated the projecting lenses and film advancing mechanism as being made up of a plurality of identical units, each unit, in turn, being of a nature similar to that described in my aforementioned co-pending application. It is obvious that there is one such unit corresponding to each aperture 15 (the partition being made up of a plurality of plates 12 one mounted in each unit) and that the number of positive films which may be printed from the single negative N is limited only by the number of apertures and units. Each unit is enclosed within a casing 41, the several casings being joined by such means as flanges 42 and bolts 43, the two extreme end casings being bolted to standards 11. The bottom walls 44 of casings 41 make up partition 12 and the casing walls, in themselves, define the sides of the film chamber 14. The ends of casings 41 are open at 45 so the negative film may extend continuously throughout.

Since all units are similar, I will describe but one in detail. The film supporting member or sprocket 46 consists of toothed disks 47 carried on shaft 48 which has bearing in the side plates 49 and 50 of casing 10. Disks 47 may be hub connected and thus form a single film sprocket, the disks being spaced apart to properly support the usual film, the latter having the usual side perforations for receiving the sprocket teeth. The space between the disks, however, allows for the insertion of the lenses and prism system employed. Rollers 51 guide and hold the negative film in proper engagement with member 46, while rollers 36 and spring tension pressure foot or backing plate 52 serve to guide and hold the positive film in proper supported engagement with member 46. Member 46 is so mounted that the portion of negative film which is stretched across aperture 15 is diametrically opposite portion 37 of the positive film.

The lenses and focusing and light intensity regulating mechanism included in the device are mounted on bracket 53 which is secured to casing walls 49, 50 by cap screws 54, this bracket extending between disks 47 to bring the lenses in correct position with respect to aperture 15 and portion 37 of the positive film. Right angle reflecting prisms 55 and 56 are secured to bracket 53 while prism 57, lenses 58 and prism 59 are mounted in a carrier 60, which carrier is adapted to be reciprocated toward and away from prisms 55, 56 by means of shaft 61, this shaft being threaded through nut 62 in bracket 53. Shaft 61 is revolved, for shifting carrier 60, through the medium of a worm wheel 63, which is slidably but non-rotatively mounted on the shaft 61, and a worm 64 meshing with the worm wheel and carried on shaft 65. Shaft 65 extends through and is journaled in plate 50 and terminates exteriorly of casing 41 in a thumb nut 66.

Light from illuminant 16 passes through apertures 15 and illuminates that portion of the positive film which is stretched across the aperture. The light rays from the illuminated negative film are turned and directed by prisms 55 and 57 through lenses 58, and are then turned and directed by prisms 59 and 56 onto portion 37 of positive film P. It is obvious that by shifting carrier 60 the focus of the system may be varied. I may provide an iris or diaphragm mechanism 67 for regulating the amount of light passing to the positive film, a hand hole 68 being provided in plate 50 to allow access to the iris regulating handle 69.

A worm wheel 70 on shaft 48 meshes with one of the worms 39 on power shaft 38, and sprocket 46 is thus adapted to be revolved by motor 40 for advancing both positive and negative films. These films, being arranged on opposite sides of the sprocket, will travel in opposite directions but the lens system is such that the image as printed on the positive film is inverted with respect to the image on the negative film and therefore successive pictures on the positive films are in proper relative position.

Take-up reel 35 may be of any suitable type, many different forms being known to the art, and may be driven by belt 72 from pulley 73 on shaft 48. While sprocket 46 positively withdraws the positive film from reel 34 at constant lineal speed, take-up 35, reel 34 at constant lineal speed, take-up 35, in spite of its variable effective diameter, is arranged to revolve just fast enough to receive the film as fed by sprocket 46 without placing the film under excessive tension. Take-up reel 20 which receives the negative film as it is fed by the last sprocket 46, functions in a manner similar to that described in connection with reel 35, and may be driven by belt 75 passing from a pulley 74 on shaft 48 of the last film advancing unit.

It is evident that the printing and film advancing operations which have been described as taking place in connection with a single unit are simultaneously occurring in connection with the remaining units, and a plurality of positive film P may thus be printed simultaneously from the single negative N.

It is also evident from the drawings and from the foregoing description that, each of the printing units being identical with the others, a printing machine may be easily built up with any desired number of units. And, regardless of the number of units, each unit functions with full efficiency to produce its point. In making up an assembly of any given number of units, the only structure special to that particular assembly is the general casing on housing 10, that may be made of sheet metal and the lamp casing 22 and angle brackets 19. These parts are relatively inexpensive to make; and the most expensive parts of the assembly—the printing units—are all duplicates. This adaptability to various sizes of machines is one of the features of my design.

As previously stated, while I have described a particular type of printer in some detail, my invention is capable of being adapted to many different types, and I do not wish to be limited to the particular embodiment illustrated and described except for such limitations as a fair interpretation of the appended claim may import:

I claim:

A printer for simultaneously printing a plurality of positives from a single negative film, embodying a casing enclosing a single illuminating chamber, a light in the casing, the wall of the casing opposite the light being approximately arcuate and concentric about the light as a center, said wall having a plurality of spaced illuminating openings, each opening directly facing the light, means to feed a single negative across the several openings, means to feed positives in printing relation to the negative outside the negative at each of said openings, said feeding means embodying an individual mechanism at each illuminating opening, and a frame for each of said mechanism, said frames being key-stone shaped and abutting and secured to each other to form a composite frame work around the outside of the arcuate wall of the illuminating chamber.

In witness that I claim the foregoing I have hereunto subscribed my name this 9 day of July 1923.

GEORGE A. MITCHELL.